T. A. MALONE.
HARVESTER.
APPLICATION FILED JUNE 5, 1917.
1,264,111.
Patented Apr. 23, 1918.
4 SHEETS—SHEET 1.
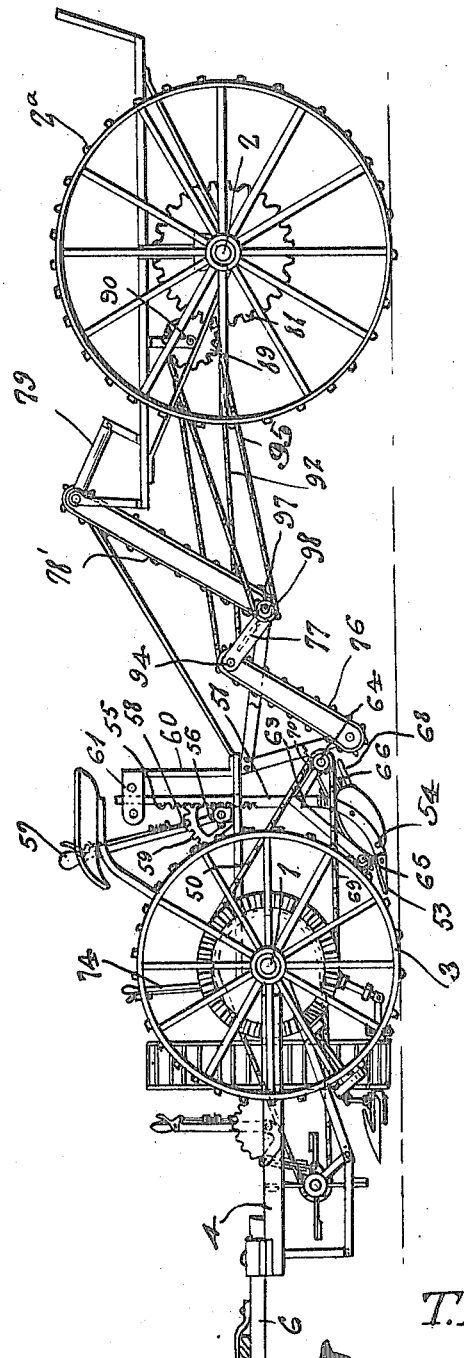
Fig. 1.
Inventor
T. A. Malone.

T. A. MALONE.
HARVESTER.
APPLICATION FILED JUNE 5, 1917.
1,264,111.
Patented Apr. 23, 1918.
4 SHEETS—SHEET 2.
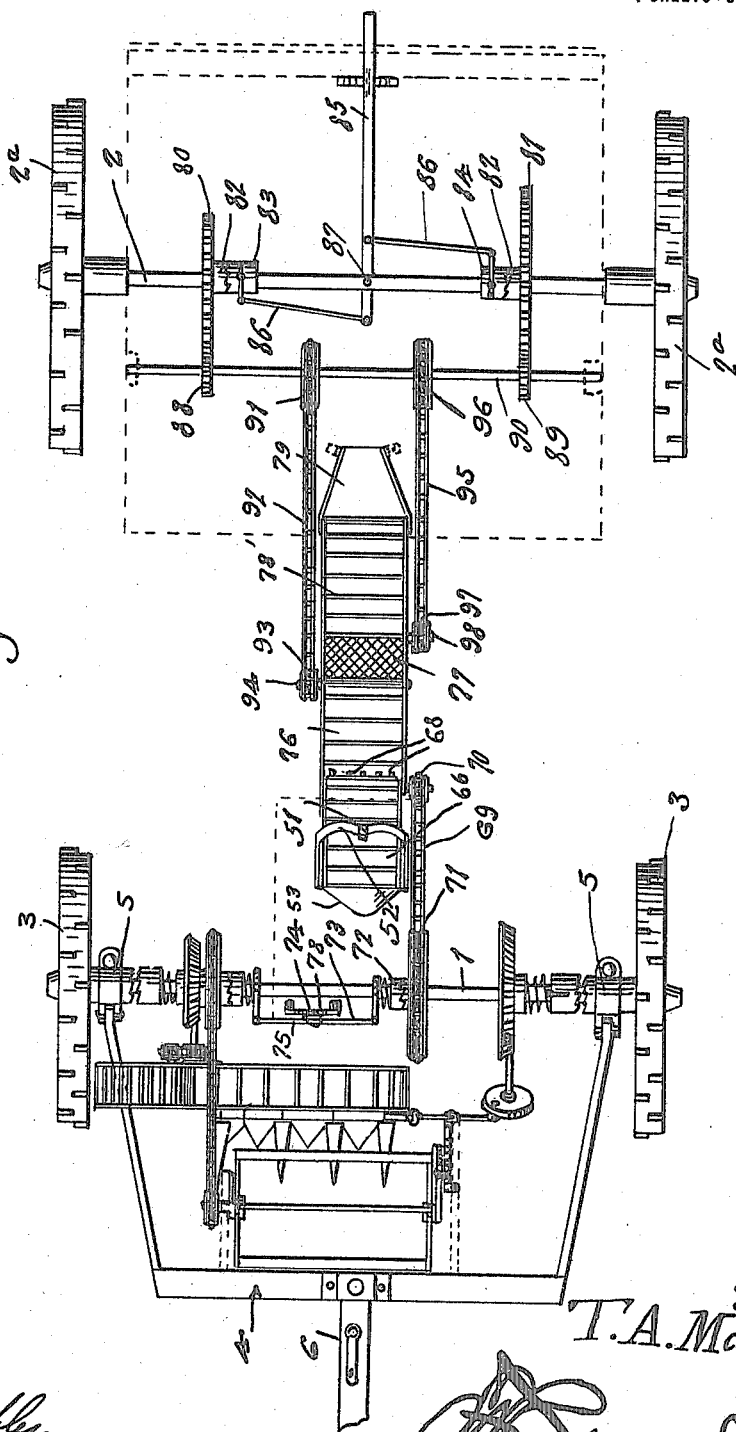

T. A. MALONE.
HARVESTER.
APPLICATION FILED JUNE 5, 1917.
1,264,111.
Patented Apr. 23, 1918.
4 SHEETS—SHEET 3.
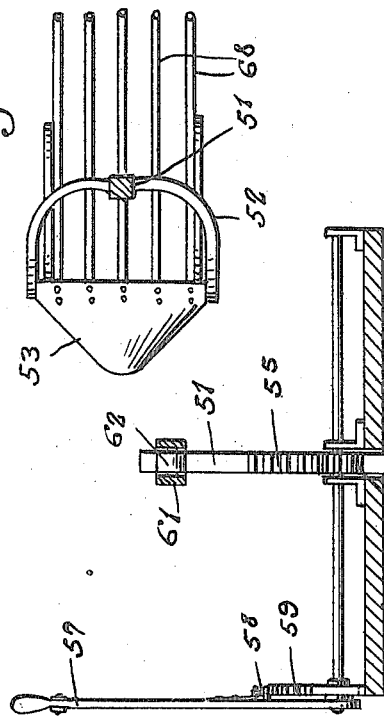
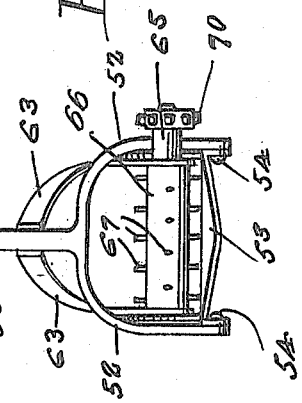
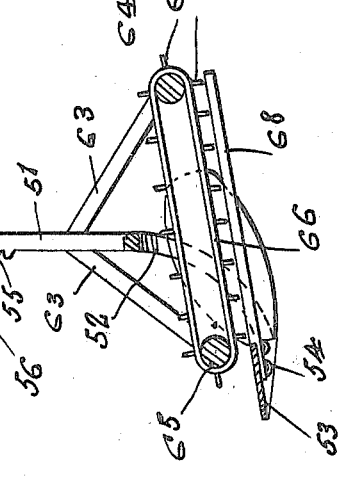
Inventor
T. A. Malone
Witnesses
By
Attorney T. A. MALONE.
HARVESTER.
APPLICATION FILED JUNE 5, 1917.
1,264,111.
Patented Apr. 23, 1918.
4 SHEETS—SHEET 4.
Fig. 6.
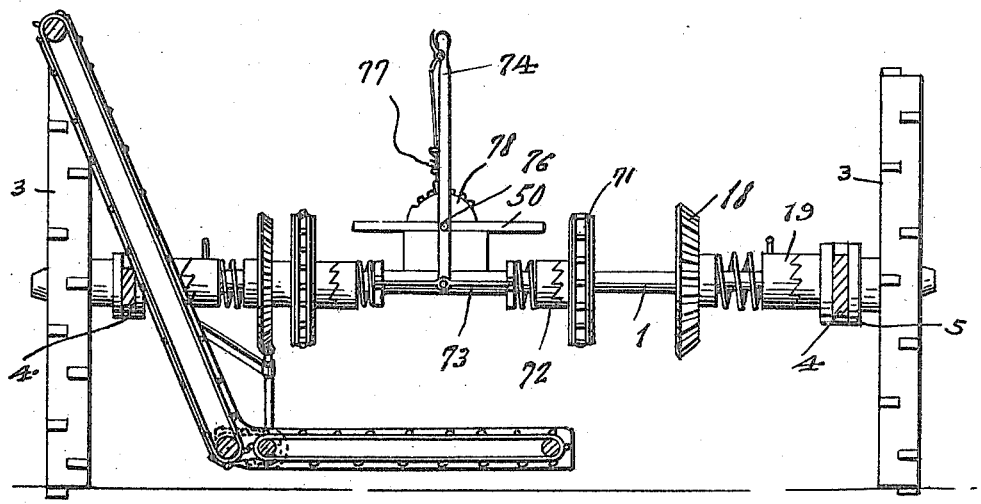
Inventor
T. A. Malone.
Witnesses:
Attorney

UNITED STATES PATENT OFFICE.

TOM ANDERSON MALONE, OF HAMLIN, TEXAS.

HARVESTER.

1,264,111.	Specification of Letters Patent.	Patented Apr. 23, 1918.

Application filed June 5, 1917. Serial No. 172,924.

*To all whom it may concern:*

Be it known that I, TOM ANDERSON MALONE, a citizen of the United States, residing at Hamlin, in the county of Jones and State of Texas, have invented certain new and useful Improvements in Harvesters; and I do hereby declare the following to be a full, clear, and exact description of the invention, such as will enable others skilled in the art to which it appertains to make and use the same.

This invention relates to harvesters, particularly designed for harvesting beets, potatoes or analogous agricultural products and the primary object of the invention is to provide a machine which will harvest a crop of agricultural products of the edible root type with a minimum amount of manual labor.

An object of this invention is to provide an uprooting mechanism which includes an uprooting plow carried by the lower forked end of a vertical standard, which vertical standard has a rack bar formed thereupon which meshes with a gear carried by a pivotally mounted hand lever, so that upon oscillatory movement of the lever the plow standard, and uprooting plow will be moved vertically for adjusting the depth of insertion of the plow to the ground and further to provide rollers for guiding the movement of the upper end of the standard of the plow.

A further object of this invention is to provide a structure for receiving the beets from the uprooting plow which includes a plurality of spaced rods, directly over which is mounted an endless conveyer having spurred flights, for travel over the rods for moving the beets upwardly and to provide suitable braces upon the standard which carries the uprooting plow, for supporting the conveyer structure.

A further object of this invention is to provide a conveyer structure which receives the beets, potatoes or analogous agricultural product from the delivery end of the rods heretofore mentioned, and elevates them for deposit into a sack, which conveyer structure comprises a pair of spaced elevators or endless conveyers having the delivery end of one connected to the receiving end of the other, by a foraminous guide, which will allow small particles of dirt to fall therethrough, or, if it is so desired, they may be connected by a sorting screen which will sort the small products from the large during their delivery from one of the elevating conveyers to the other.

With the foregoing and other objects in view, this invention consists in such novel features of construction, combination and arrangement of parts as will be hereinafter more fully described, illustrated in the accompanying drawings and claimed.

In describing the invention in detail, reference will be had to the accompanying drawings wherein like characters designate like and corresponding parts throughout the several views, and in which:—

Figure 1 is a side elevation of the improved harvester;

Fig. 2 is a top plan view of the harvester;

Fig. 3 is a detail section illustrating the uprooting plow structure;

Fig. 4 is a section taken transversely to the section illustrated in Fig. 3, and showing the plow structure in front elevation;

Fig. 5 is a horizontal section illustrating the uprooting plow structure;

Fig. 6 is a vertical cross section through the front end of the machine.

Referring more particularly to the drawings, 1 indicates the front axle of the harvester and 2 indicates the rear axle of the harvester. The front axle 1 of the harvester has the usual type of supporting wheels 3 mounted upon the spindle ends of the same and it has a forwardly extending supporting frame 4 connected thereto, through the medium of collars 5 as clearly shown in Fig. 2 of the drawings. The forwardly extending frame 5 has the usual type of tongue structure 6 connected thereto, to which the draft animals of the implement are hitched.

A suitable platform 50 is provided, through which the vertical beam 51 extends. The beam 51 has its lower end forked as shown at 52, which forked ends are connected to the uprooting plow 53 as shown at 54. The plow 53 comprises a blade which is bent longitudinally, centrally of its side edges, as clearly shown in Fig. 4 of the drawings the side edges of which converge at the forward end of the plow for forming a blade for uprooting the beets, potatoes or the like.

The beam 51 has a plurality of rack teeth 55 formed thereon which mesh with the teeth of a gear 56. The gear 56 is carried by a pivoted hand lever 57 so that upon the pivotal movement of the hand lever the beam 51 will be moved vertically, for adjusting the elevation of the uprooting plow 53. The lever 57 has the usual type of dog mechanism 58 carried thereby which coacts with a quadrant 59 for holding the lever in adjusted position. A bracket 60 is carried by the platform 50 and it has a boxing 61 carried at its upper end which rotatably supports a pair of guide rollers 62, one of which is positioned upon each edge of the beam 51 as clearly shown in Fig. 3 of the drawings, for guiding the vertical movement of the upper end of the beam.

A plurality of braces 63 are attached to the lower portion of the beam 51 and they support a pair of rollers 64 and 65 about which an endless conveyer 66 travels. The conveyer 66 includes spurred flights 67, which pass over a plurality of rods 68, that are attached to and extend rearwardly from the rear edge of the uprooting plow 53. The rods 68 are spaced with respect to each other, so as to allow dirt to fall therebetween during the passage of the agricultural products upwardly over the rods. The endless conveyer 66 is driven by a sprocket chain 69, which passes about a sprocket 70 carried by the roller 64 and about a sprocket 71 which is mounted upon the axle 1. The rotation of the sprocket 71 is controlled by a clutch structure 72 of the ordinary type. The clutch structure 72 has a rod 73 connected thereto which is in turn connected to a pivotally mounted hand lever 74. The usual type of dog mechanism 77 that coacts with a quadrant 78 is provided for holding the lever 74 in adjusted position.

The agricultural products are delivered from the conveyer 66 upon an elevator 76, which elevates the agricultural products, such as beets, potatoes or the like and deposits them upon a foraminous platform or guide 77. The mesh of the foraminous guide 77 may be regulated as desired, either for sorting the small potatoes from the large, if desired, or for merely permitting the passage of dirt downwardly therethrough, which dirt might be shaken from the products during their upward travel with the elevator 76. The foraminous guide 77 inclines downwardly from the upper delivery end of the elevator 76 and it delivers the products to a second elevator 78′. The elevator 78′ carries the agricultural products upwardly and deposits them in a chute 79, from which they are delivered to a suitable retaining receptacle, such as sacks or the like.

The rear axle 2, of the harvester, which has the usual type of supporting wheels $2^a$ mounted thereon, has gears 80 and 81 mounted thereon for rotation independently of the shaft. The gears 80 and 81 have clutch sections 82 carried thereby which are adapted for coaction with clutch sections 83 and 84 respectively. The clutch sections 83 and 84 are feathered upon the axle 2 and they are operated through the medium of the pivotal movement of the hand lever 85, which hand lever is connected to the clutch sections by rods 86. One of the clutch sections is connected upon one side of the pivot 87 of the hand lever while the other is connected upon the opposite side of the pivot, as clearly shown in Fig. 2 of the drawings, so that both clutch sections will be operated in unison upon the pivotal movement of the hand lever 85.

The gears 80 and 81 mesh with pinions 88 and 89 respectively, which are carried by a shaft 90. The shaft 90 has a sprocket 91 mounted thereon about which a sprocket chain 92 travels. The sprocket chain 92 also travels about a sprocket 93 which is mounted upon the operating shaft 94 of the elevator 76. The elevator 78 is operated from the shaft 90 through the medium of a sprocket chain 95 which travels about a sprocket 96 carried by the shaft 90 and about a sprocket 97 carried by the operating shaft 98 of the elevator 78′.

The beets, or other agricultural products are uprooted by the shovel 53, and forced upwardly, by the forward travel of the harvester over the shovel upon the rods 68, where they are engaged by the lower upwardly traveling run of the conveyer 66. The conveyer 66 will move the products upwardly over the rods 68 and deliver them to the elevator 76. The elevator 76 elevates the beets and deposits them upon the sorter or foraminous screen 77, which in turn delivers them to the elevator 78′. During the passage of the products over the screen 77, the loose dirt will be permitted to fall through the mesh of the screen upon the ground. The products are delivered by the elevator 78′ to the chute 79, which in turn delivers them to sacks or other suitable retaining receptacles.

From the foregoing description taken in connection with the accompanying drawings the advantages of construction and of the method of operation of the improved harvester, will be readily apparent to those skilled in the art to which this invention appertains, and while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a harvester structure, a supporting platform, a standard adjustably carried by said platform, the lower end of said standard being forked, an uprooting plow carried by said forked end, a plurality of rods attached to and extending rearwardly from said plow, a plurality of supporting arms attached to said standard, a conveyer supported by said supporting arms and positioned directly over said spaced rods for elevating products over the rods.

2. In a harvester structure, a supporting platform, a standard adjustably carried by said platform, the lower end of said standard being forked, an uprooting plow carried by said forked end, a plurality of rods attached to and extending rearwardly from said plow, a plurality of supporting arms attached to said standard, a conveyer supported by said supporting arms and positioned directly over said spaced rods for elevating products over the rods, an elevator positioned for receiving products from said rods, a screen positioned at the delivery end of said elevator, and a second elevator for receiving products from said screen.

In testimony whereof I affix my signature in presence of two witnesses.

TOM ANDERSON MALONE.

Witnesses:
W. S. CARRUTHERS, Sr.,
W. R. TOMLINSON.

Copies of this patent may be obtained for five cents each, by addressing the "Commissioner of Patents, Washington, D. C."